(12) United States Patent
Griffin, III et al.

(10) Patent No.: US 7,185,484 B2
(45) Date of Patent: Mar. 6, 2007

(54) METHODS AND APPARATUS FOR ASSEMBLING A GAS TURBINE ENGINE

(75) Inventors: Rollin George Griffin, III, Cincinnati, OH (US); William James Morrow, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/915,760

(22) Filed: Aug. 11, 2004

(65) Prior Publication Data

US 2006/0032210 A1 Feb. 16, 2006

(51) Int. Cl.
*F02K 3/02* (2006.01)

(52) U.S. Cl. .................. 60/226.1; 416/128; 415/68

(58) Field of Classification Search ........... 60/226.1, 60/262, 263, 268, 39.162, 774; 416/198, 416/129, 123, 128, 124, 126, 148 R, 203, 416/198 R; 415/68, 69, 199.5
See application file for complete search history.

(56) References Cited

U.S. PATENT DOCUMENTS

| | | | | |
|---|---|---|---|---|
| 4,010,608 A | * | 3/1977 | Simmons ................ | 60/226.3 |
| 4,064,692 A | * | 12/1977 | Johnson et al. ........... | 60/762 |
| 4,577,462 A | | 3/1986 | Robertson | |
| 4,790,133 A | | 12/1988 | Stuart | |
| 4,860,537 A | * | 8/1989 | Taylor .................. | 60/226.1 |
| 4,965,994 A | * | 10/1990 | Ciokajlo et al. .......... | 60/805 |
| 4,969,325 A | * | 11/1990 | Adamson et al. ......... | 60/226.1 |
| 5,028,207 A | | 7/1991 | Rohra et al. | |
| 5,274,999 A | * | 1/1994 | Rohra et al. ............. | 60/226.1 |
| 5,307,622 A | * | 5/1994 | Ciokajlo et al. .......... | 60/39.162 |
| 5,361,580 A | * | 11/1994 | Ciokajlo et al. .......... | 60/226.1 |
| 5,404,713 A | * | 4/1995 | Johnson .................. | 60/204 |
| 5,443,590 A | * | 8/1995 | Ciokajlo et al. .......... | 416/128 |
| 5,809,772 A | * | 9/1998 | Giffin et al. ............. | 60/226.1 |
| 5,911,679 A | * | 6/1999 | Farrell et al. ............ | 60/39.183 |

(Continued)

FOREIGN PATENT DOCUMENTS

EP 1387060 A2 2/2004

(Continued)

OTHER PUBLICATIONS

Munich Search Report; Reference No. 120712/10852; Application No. Patent No. 05254610.8—2422 PCT/; Dated Oct. 19, 2005; 7 pags.

*Primary Examiner*—William H. Rodriguez
(74) *Attorney, Agent, or Firm*—William Scott Andes; Armstrong Teasdale LLP (57) ABSTRACT

Methods and apparatus for assembling a gas turbine engine are provided. The method includes coupling a first turbine shaft that includes m rows of turbine blades within the gas turbine such that the first turbine shaft is rotatable in a first direction, and coupling a second turbine shaft that includes n rows of turbine blades within the gas turbine such that the second turbine shaft is rotatable in a second direction wherein a torque split between the first and second turbine shafts is substantially proportional to the number of rows of turbine blades on each shaft relative to a total number of rows of blades on both shafts, and wherein m and n are selected to provide a torque split between the first turbine shaft and second turbine shaft of greater than about 1.2:1.

18 Claims, 6 Drawing Sheets

U.S. PATENT DOCUMENTS

| | | |
|---|---|---|
| 6,363,708 B1 | 4/2002 | Rakhmailov |
| 6,619,030 B1 * | 9/2003 | Seda et al. ................ 60/226.1 |
| 6,666,017 B2 * | 12/2003 | Prentice et al. ............ 60/226.1 |
| 6,711,887 B2 * | 3/2004 | Orlando et al. ........... 60/39.162 |
| 6,763,652 B2 * | 7/2004 | Baughman et al. ....... 60/39.162 |
| 6,763,653 B2 * | 7/2004 | Orlando et al. ............ 60/226.1 |
| 6,763,654 B2 * | 7/2004 | Orlando et al. ............ 60/226.1 |
| 2003/0092983 A1 | 5/2003 | Baker et al. |
| 2003/0163983 A1 * | 9/2003 | Seda et al. ................ 60/226.1 |
| 2003/0217546 A1 | 11/2003 | Prentice et al. |
| 2004/0031260 A1 | 2/2004 | Orlando et al. |
| 2004/0055275 A1 | 3/2004 | Joseph et al. |
| 2004/0055276 A1 | 3/2004 | Lewis et al. |
| 2004/0060279 A1 | 4/2004 | Joseph et al. |

FOREIGN PATENT DOCUMENTS

| | | |
|---|---|---|
| EP | 1403485 A2 | 3/2004 |
| GB | 2189844 A | 11/1987 |

* cited by examiner

METHODS AND APPARATUS FOR ASSEMBLING A GAS TURBINE ENGINE

BACKGROUND OF THE INVENTION

This invention relates generally to gas turbine engines and, more particularly, to methods and apparatus for providing non-equal torque between counter-rotating gas turbine engine rotors that have one or more interdigitated rotors.

At least some known gas turbine engines include a forward fan, a core engine, and a power turbine. The core engine includes at least one compressor, a combustor, a high-pressure turbine, and a low-pressure turbine coupled together in a serial flow relationship. More specifically, the compressor and high-pressure turbine are coupled through a high-pressure shaft to define a high-pressure rotor. The compressor compresses air entering the core engine that is then mixed with fuel and ignited to form a high energy gas stream. The gas stream flows through the high-pressure turbine, rotatably driving it and the high-pressure shaft that, in turn, rotatably drives the compressor.

The gas stream is expanded as it flows through the low-pressure turbine. The low-pressure turbine rotatably drives the fan through a low-pressure shaft such that a low-pressure rotor is defined by the fan, the low-pressure shaft, and the low-pressure turbine. At least some known low pressure turbines include counter-rotating turbines that power counter-rotating fans and counter-rotating boosters and/or low pressure compressors.

Improved engine efficiency and power output may depend on increased flexibility of design choices of each engine component. Specifically, the design of a low-pressure turbine may restrict available design choices for fans and/or boosters to be coupled to the low-pressure turbine. For example, at least some known low-pressure turbines include outlet guide vanes, which may be used to limit the tangential momentum of the combustion gas stream exiting the engine. Removing the outlet guide vanes decreases the overall engine weight, but may increase the detrimental effects of tangential momentum.

Generally, operating known counter-rotating turbines when torque is split substantially equally between the forward and aft shaft shafts facilitates optimizing the efficiency of such turbines. However, improved engine performance may be achieved, for example, by operating the forward fan at a higher fan pressure ratio and/or higher rotational speed than the aft fan, providing boosters or flades (fan-on-blade) to the forward or aft fan shaft, or providing two rotors with an intervening stator on one shaft.

Such operation, however, may result in a substantial non-equal torque demand between the counter-rotating rotors, such as, approximately 2:1 or greater. Such non-equal torque has not been attainable with known counter-rotating low-pressure rotor configurations.

BRIEF DESCRIPTION OF THE INVENTION

In one embodiment, a method of assembling a gas turbine engine is provided. The method includes coupling a first turbine shaft that includes m rows of turbine blades within the gas turbine such that the first turbine shaft is rotatable in a first direction, and coupling a second turbine shaft that includes n rows of turbine blades within the gas turbine such that the second turbine shaft is rotatable in a second direction wherein a torque split between the first and second turbine shafts is substantially proportional to the number of rows of turbine blades on each shaft relative to a total number of rows of blades on both shafts, and wherein m and n are selected to provide a torque split between the first turbine shaft and second turbine shaft of greater than about 1.2:1.

In another embodiment, a gas turbine engine turbine assembly is provided. The gas turbine engine turbine assembly includes a compressor; a high pressure turbine coupled to the compressor by a rotor shaft; and a low pressure turbine including at least one row of turbine stator blades spaced circumferentially apart and defining at least a portion of a flowpath extending through the low pressure turbine, the low pressure turbine further including a first rotor shaft coaxially aligned about second rotor shaft, the first rotor shaft including m first rows of turbine blades, the second rotor shaft including n second rows of turbine blades wherein m and n are different with respect to each other, the first rotor shaft rotatably coupled to a first compressor, the second rotor shaft rotatably coupled to a second compressor.

In yet another embodiment, a gas turbine engine assembly including a counter-rotatable low-pressure turbine is provided. The gas turbine engine assembly includes a low pressure turbine flowpath, a first forward fan shaft including a forward fan coupled to a compressor end of the first forward fan shaft and m first low pressure turbine blade rows extending into the low pressure turbine flowpath, a second aft fan shaft coaxially aligned about a longitudinal axis with the first forward fan shaft, the second aft fan shaft including n second low pressure turbine blade rows extending into the low pressure turbine flowpath wherein m and n are positive integers representing a number of blade rows, and wherein m and n are different with respect to each other.

DETAILED DESCRIPTION OF THE INVENTION

Figure 1:
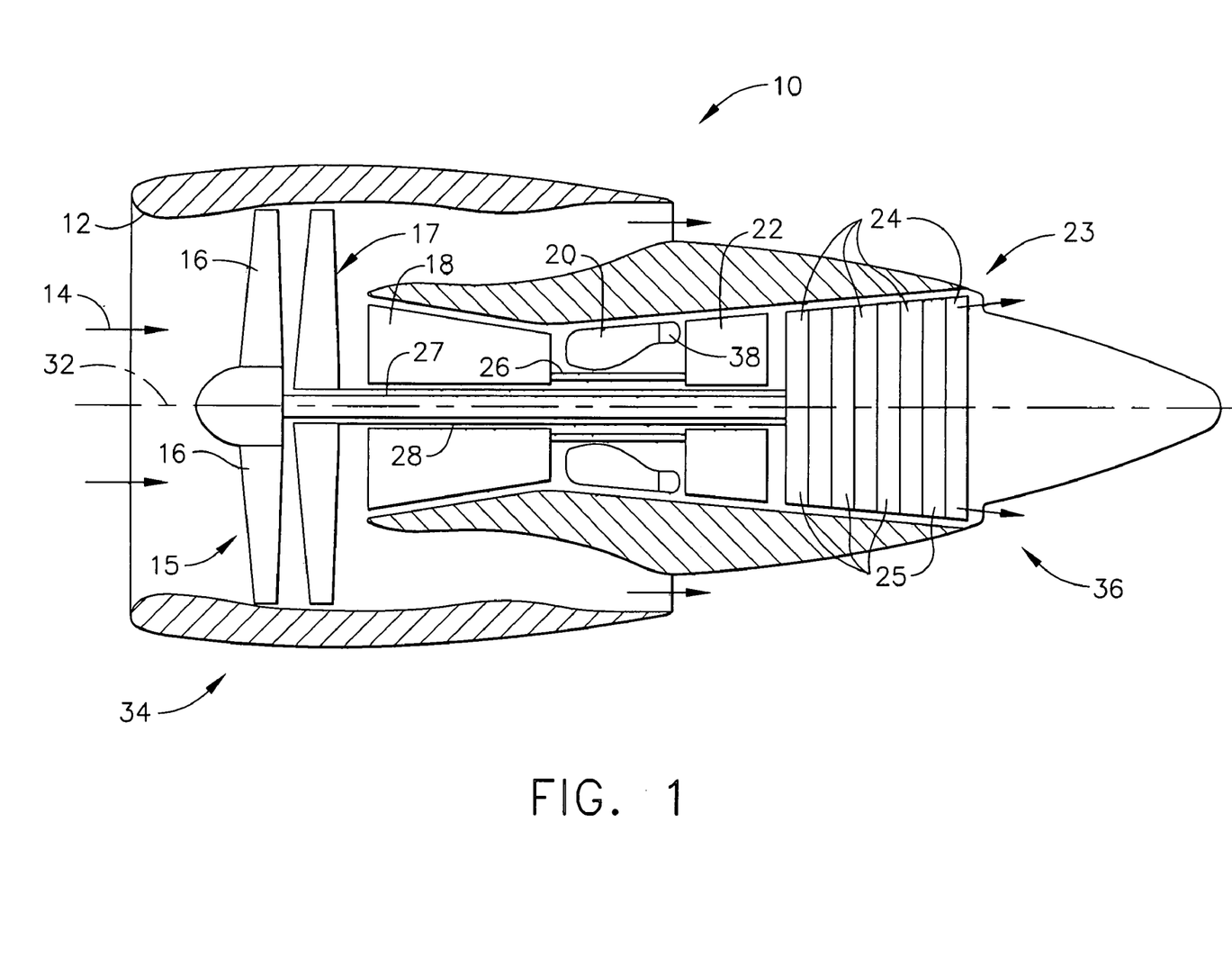
FIG. 1 is a schematic illustration of an exemplary high bypass, counter-rotating turbofan gas turbine engine.

FIG. 1 is a schematic illustration of an exemplary high bypass, counter-rotating turbofan gas turbine engine 10 having in serial flow communication an inlet 12 for receiving ambient air 14, a counter-rotating fan assembly 15 including a forward fan 16 and an aft fan 17, a compressor 18, a combustor 20, a high pressure turbine 22, and a counter-rotating low pressure turbine assembly 23 that includes a forward fan low pressure turbine 24 and an aft fan low pressure turbine 25. High pressure turbine 22 is coupled to compressor 18 by a high pressure shaft 26, forward fan low pressure turbine 24 is coupled to forward fan 16 through a forward fan shaft 27, and aft fan low pressure turbine 25 is coupled to aft fan 17 through an aft fan shaft 28. In the exemplary embodiment, forward fan shaft 27 rotates about an axis of symmetry 32 extending from an upstream side 34 of engine 10 aft to a downstream side 36 of engine 10 coaxially with and radially inwardly from aft fan shaft 28.

In operation, air flows through counter-rotating fans 16 and 17 and a portion of the compressed air is supplied to high-pressure compressor 18. The rest of the compressed air is bypassed around high-pressure compressor 18. Highly compressed air is delivered to combustor 20. Combustion gases 38 from combustor 20 propel turbines 22, 24, and 25. High-pressure turbine 22 rotates high pressure shaft 26 and high-pressure compressor 18, while low pressure turbine 24 rotates forward fan shaft 27 and forward fan 16 about axis 32 and low-pressure turbine 25 rotates aft fan shaft 28, and aft fan 17 about axis 32.

Figure 2:
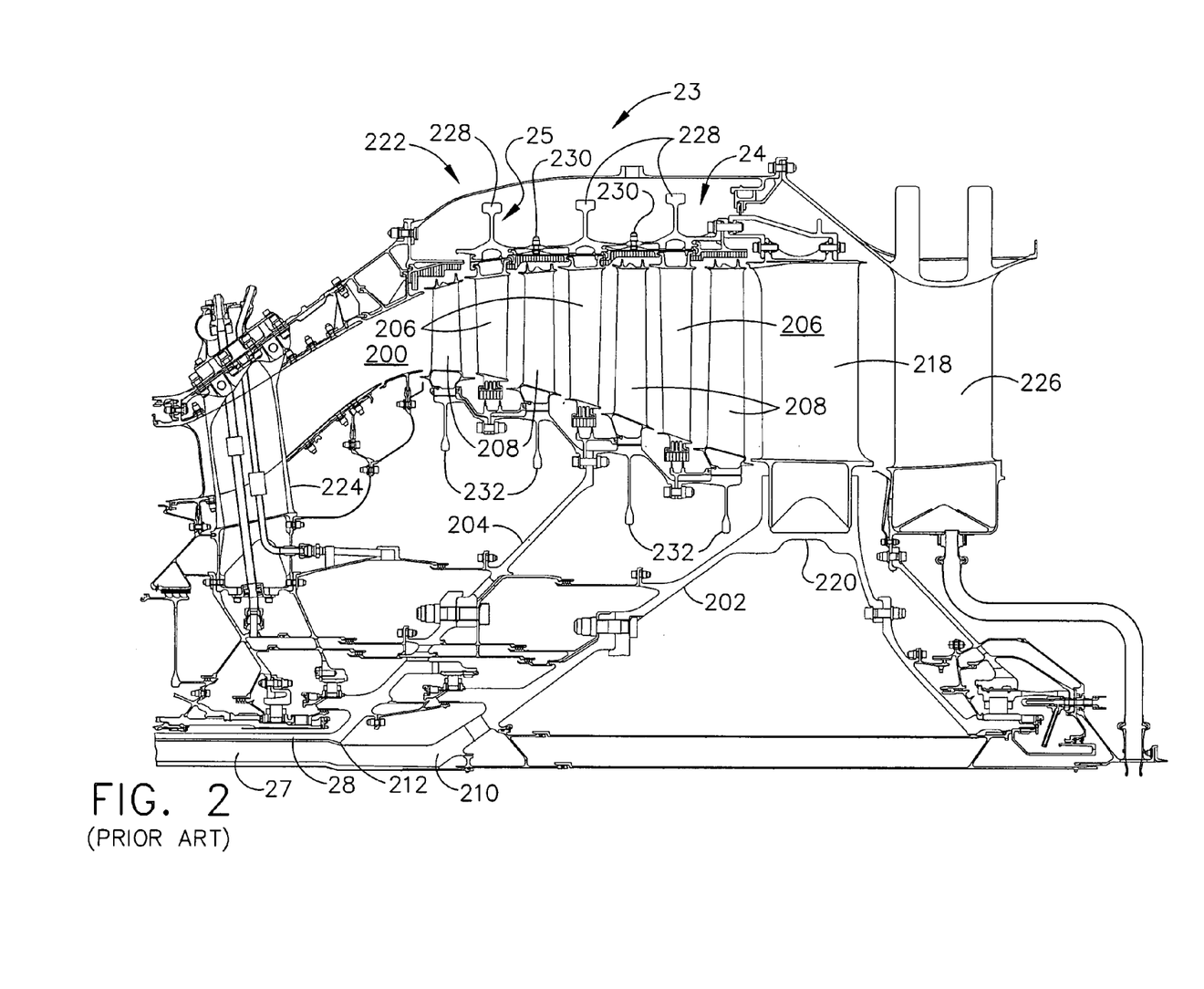
FIG. 2 is an enlarged cross-sectional view of a prior art counter-rotating low pressure turbine assembly that may be used with a gas turbine engine similar to the gas turbine engine shown in FIG. 1.

FIG. 2 is an enlarged cross-sectional view of a prior art counter-rotating low pressure turbine assembly 23 that may be used with a gas turbine engine similar to gas turbine engine 10 (shown in FIG. 1). Low-pressure turbine assembly 23 includes a low-pressure turbine flowpath 200. In the exemplary embodiment, inner forward fan shaft 27 and outer aft fan shaft 28 include counter-rotatable interdigitated low pressure inner and outer shaft turbines (shown generally at 24 and 25 in FIG. 2), having low pressure inner and outer shaft turbine rotors 202 and 204, respectively. Low-pressure inner and outer shaft turbine rotors 202 and 204 include low-pressure first and second turbine blade rows 206 and 208, respectively, extending across low-pressure turbine flowpath 200. Counter-rotatable low pressure inner and outer spools 210 and 212 include low pressure inner and outer shaft turbine rotors 202 and 204 drivingly coupled to forward and aft fan blade rows 16 and 17 by low pressure inner and outer shafts 27 and 28, respectively.

Inner forward fan shaft 27 and outer aft fan shaft 28 are at least partially rotatably aligned co-axially with and radially inward of high-pressure shaft 26. In the exemplary embodiment, low pressure inner and outer shaft turbine rotors 202 and 204 each include four rows of low pressure first and second turbine blade rows 208 and 206, respectively.

In the exemplary embodiment, low pressure first and second turbine blade rows 206 and 208 are alternately interdigitated. In alternative embodiments, low pressure first and second turbine blade rows 206 and 208 may be only partially interdigitated or may be completely tandem.

An aftmost or fourth row 218 of first low pressure turbine blade rows 206 is coupled to a rotating frame 220 that supports a radially outer turbine ring assembly 222 and is rotatably supported by a center frame 224 and a turbine aft frame 226. Radially outer turbine ring assembly 222 includes three separate turbine rotor rings 228 from which the first three first low-pressure turbine blade rows 206 are supported respectively. Turbine rotor rings 228 are coupled together by bolted connections 230. Low-pressure outer shaft turbine rotor 204 includes four low-pressure first turbine disks 232 that support low-pressure turbine blade rows 208.

Figure 3:
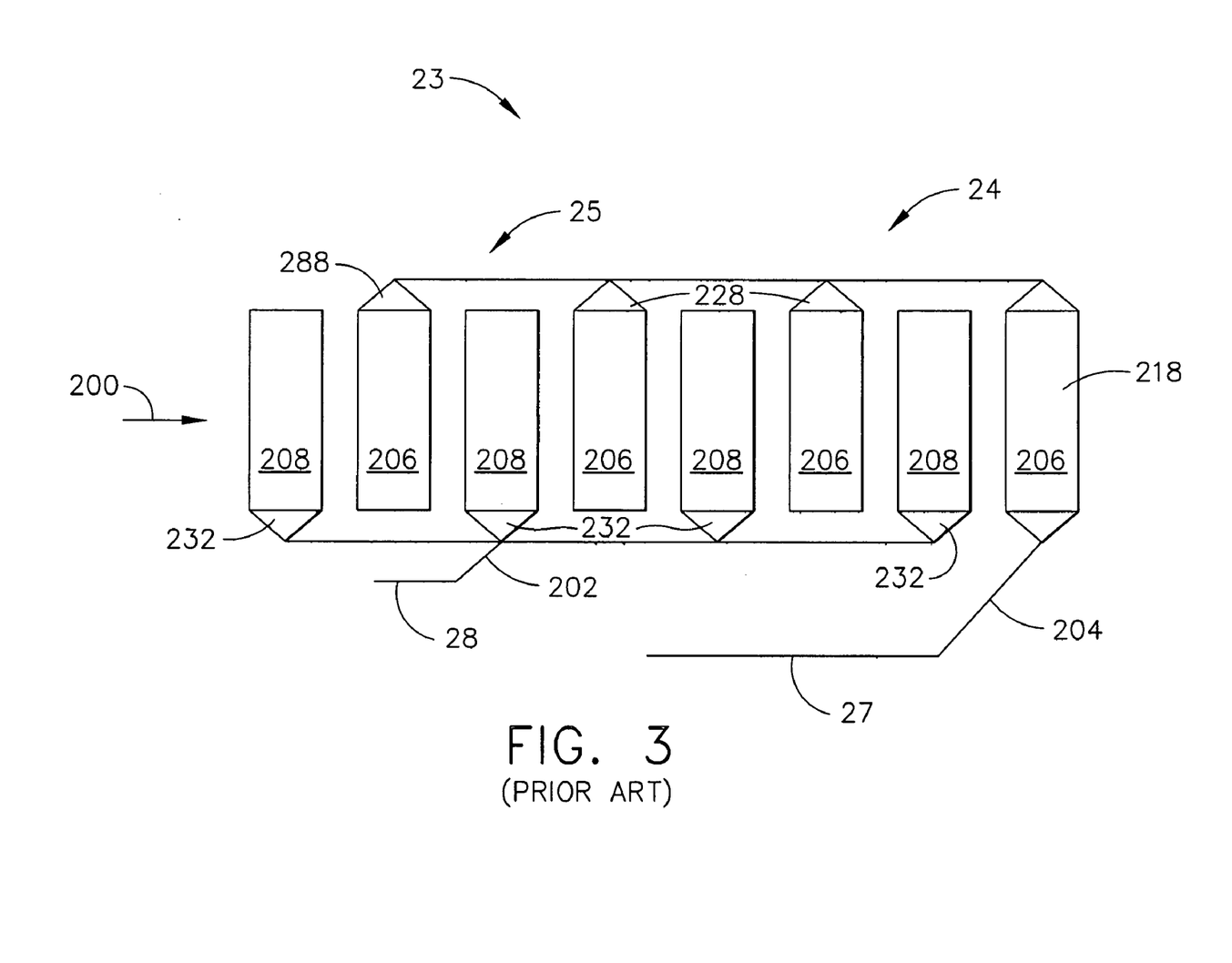
FIG. 3 is a schematic diagram of the prior art counter-rotating low pressure turbine assembly shown in FIG. 2.

FIG. 3 is a schematic diagram of prior art counter-rotating low-pressure turbine assembly 23 (shown in FIG. 2). Items shown in FIG. 2 that are also shown in FIG. 3 are called out in FIG. 3 using the same reference numbers used in FIG. 2. Accordingly, counter-rotating low pressure turbine assembly 23 includes inner forward fan shaft 27 and outer aft fan shaft 28 coupled to four low pressure first turbine blade rows 206 and four low pressure second turbine blade rows 208 that are alternately interdigitated. In the exemplary embodiment, there are no intervening stators within turbine assembly 23.

Blade rows 206 are mounted outward from flowpath 200 and may utilize conventional disk construction. Blade rows 208 are mounted inward from a rotating outer casing (not shown). Each of inner forward fan shaft 27 and outer aft fan shaft 28 include the same number of blade rows 206 and blade rows 208, for example four rows, which is described as a four by four configuration. In alternative embodiments, a blade row may be added to forward fan shaft 27 such that a five by four, forward-to-aft configuration is formed. Similarly, a blade row may be eliminated from aft fan shaft 28, which would result in a four by three configuration. Accordingly, an odd by even configuration from an even by even configuration or an even by odd configuration from an odd by odd configuration may be formed within the same basic low pressure turbine assembly architecture.

For the above described configurations, because a net torque acting on forward fan shaft 27 and aft fan shaft 28 equals the change in angular momentum between the gas entering the most forward row of blade row 208 and the gas exiting blade row 206, and assuming an equal change of tangential momentum for each blade row, a torque split between forward fan shaft 27 and aft fan shaft 28 may be determined to be 50/50, 56/44 and 57/43. Torque split or the ratio of torque supplied by each shaft relative to the total torque supplied may be determine using $m/(m+n)$ and $n/(m+n)$, where m and n are the number of blade rows coupled to each respective turbine shaft. As is apparent, the torque split between the shafts is limited to a relatively narrow range of possibilities because m and n can differ by only zero or one.

In operation, counter-rotating fans with widely different torque requirements and/or additional boosters coupled to one fan shaft may not be able to be implemented optimally due to the torque split limitation of the counter-rotating turbines. Such narrow range of design possibilities may limit the efficiency and/or power boost possibilities due to the limited torque split available in prior art low-pressure turbines.

Figure 4:
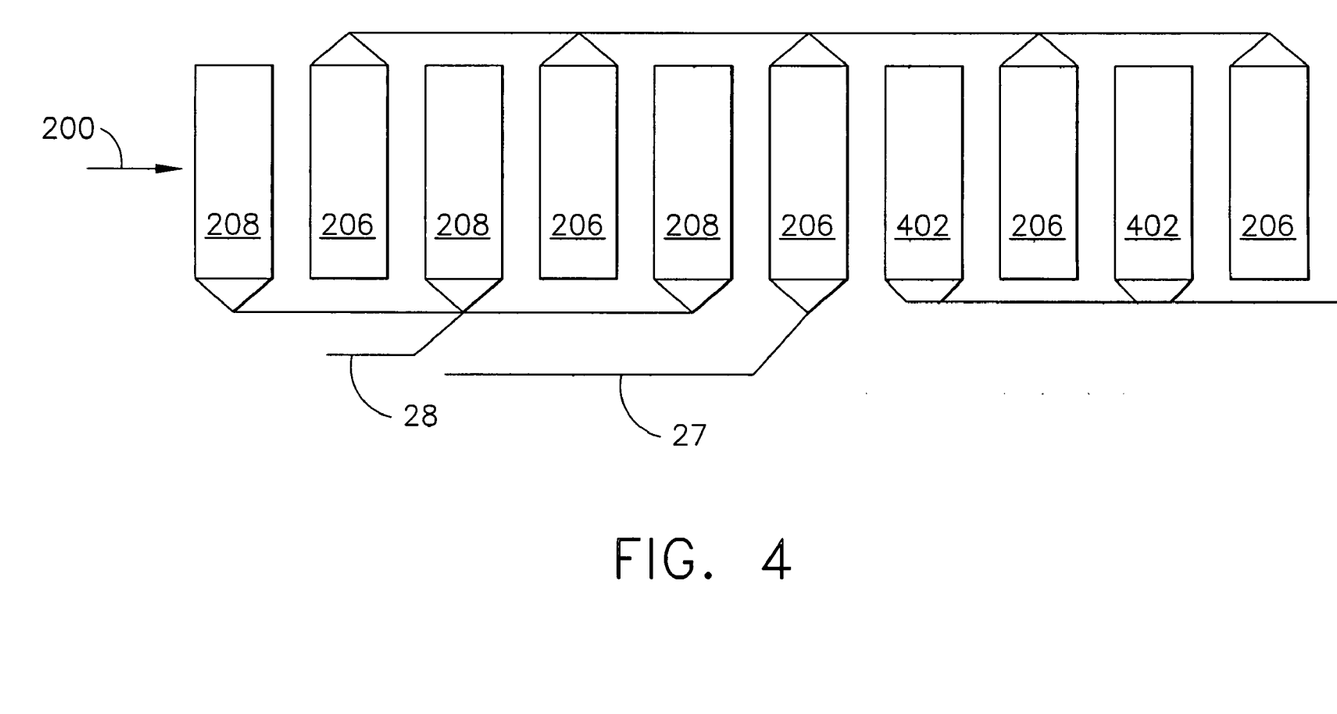
FIG. 4 is a schematic diagram of an exemplary counter-rotating low pressure turbine assembly having the same total number of low pressure turbine blade rows as the turbine shown in FIG. 3.

FIG. 4 is a schematic diagram of an exemplary counter-rotating low pressure turbine assembly having the same total number of low pressure turbine blade rows 206 and 208 as turbine 23 (shown in FIG. 3). However, in the exemplary embodiment, forward fan shaft 27 is configured with five low-pressure first turbine blade rows 206 and aft fan shaft 28 is configured with three low-pressure second turbine blade rows 208. Two stator blade rows 402 have been added to this configuration. In the exemplary embodiment, stator blade rows 402 extend into flow path 200 from an inner non-rotating portion of the turbine assembly. Determining torque split, as described above for this configuration yields a torque split of 5/8:3/8, or 63/37. The torque split is significantly greater for this configuration than for the prior art turbine described above. Low pressure turbine blade rows 206 are interdigitated with low pressure turbine blade rows 208 and stator blade rows 402

Figure 5:
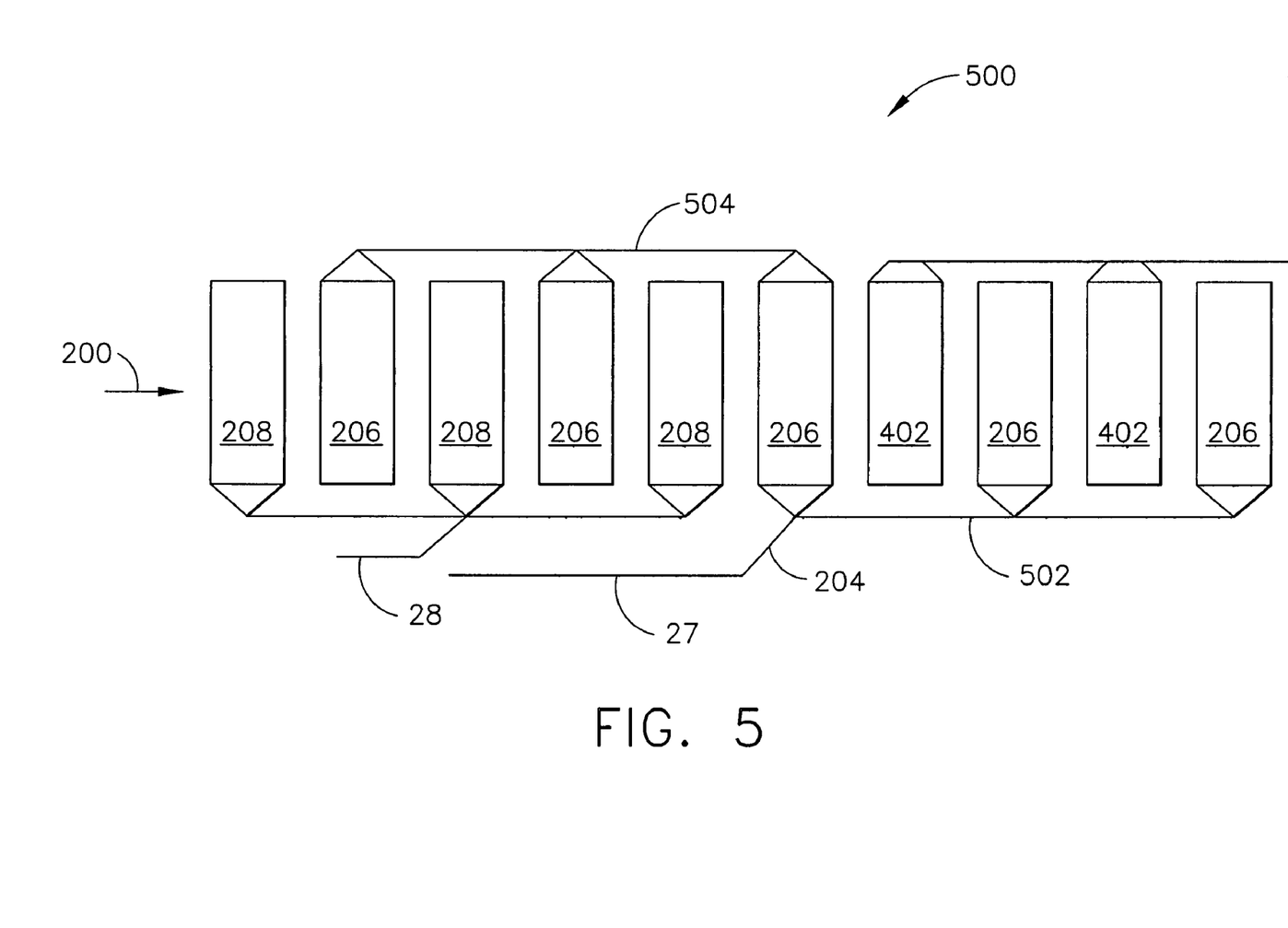
FIG. 5 is a schematic diagram of another exemplary counter-rotating low pressure turbine assembly.

FIG. 5 is a schematic diagram of another exemplary counter-rotating low-pressure turbine assembly. Low-pressure turbine blade rows 206 and 208, two stator blade rows 402 are shown interdigitated similarly as turbine 23 shown in FIG. 4. However, in this exemplary embodiment, stator blade rows 402 extend into flow path 200 from an outer non-rotating portion of the turbine assembly. Accordingly, outer shaft turbine rotor 204 includes both an inner rotating portion 502 and an outer rotating portion 504. Determining torque split, as described above for this configuration yields a torque split of 5/8:3/8, or 63/37. In an alternative embodiment, forward fan shaft 27 is configured with six low pressure first turbine blade rows 206 and aft fan shaft 28 is configured with two low pressure second turbine blade rows 208 and may include four stator blade rows 402. In this alternative embodiment, the torque split is 75/25. Such a torque split is useful to facilitate an engine design wherein fans and/or boosters of widely varying operating parameters may be used to optimize the operation of engine 10.

Figure 6:
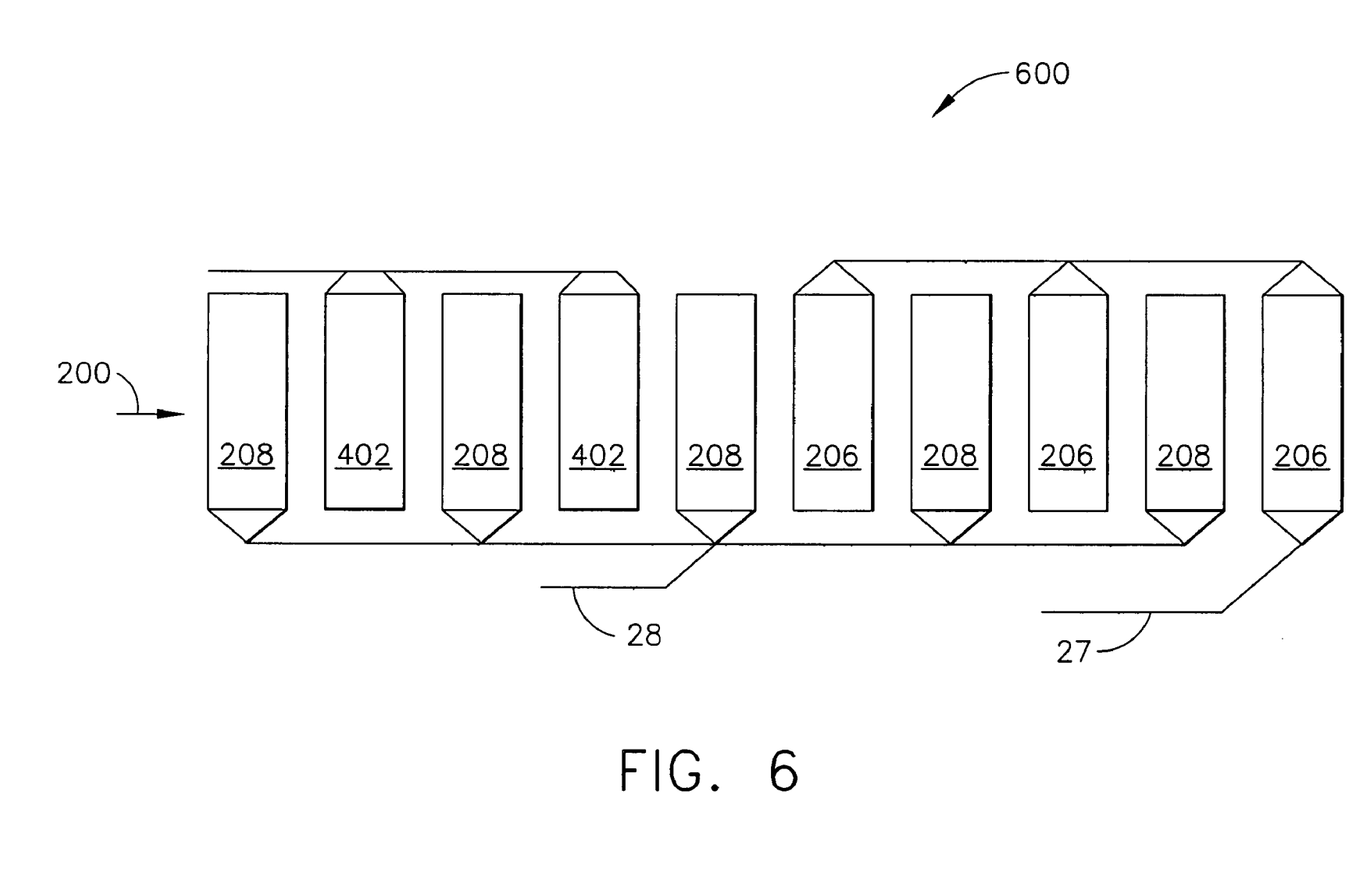
FIG. 6 is a schematic diagram of another exemplary counter-rotating low-pressure turbine assembly.

FIG. 6 is a schematic diagram of another exemplary counter-rotating low-pressure turbine assembly 600. Low pressure turbine blade rows 206 and 208, and two stator blade rows 402 that extend into flow path 200 from an outer non-rotating portion of the turbine assembly are shown interdigitated similarly as turbine 500 shown in FIG. 5. In the exemplary embodiment, forward fan shaft 27 is configured with three low pressure first turbine blade rows 208 interdigitated with two stator blade rows 402, and aft fan shaft 28 is configured with five low pressure second turbine blade rows 208. Determining torque split, as described above for this configuration yields a torque split of 3/8:5/8, or 37/63. In an alternative embodiment, forward fan shaft 27 is configured with two low pressure first turbine blade rows 206 and aft fan shaft 28 is configured with six low pressure second turbine blade rows 208 and may include four stator blade rows 402. In this alternative embodiment, the torque split is 25/75. In a further alternative embodiment, stator blade rows 402 may extend into flowpath 200 from an inner non-rotating portion of turbine 600 and aft fan shaft 28 is split such that aft fan shaft 28 includes an inner shaft portion and an outer shaft portion.

The exemplary embodiments described above illustrate a counter-rotating low pressure turbine having eight total rotating blades by way of illustration only and is not limiting as configurations of other numbers for low pressure turbine blade rows 206 and 208 may be applied to achieve a desired turbine torque split to accommodate a torque demand of wide variety of counter-rotating compressor arrangements.

The above-described methods and apparatus are cost-effective and highly reliable methods and apparatus for providing a torque split between counter-rotating rotors in a low pressure turbine of a gas turbine engine that is greater than twenty percent. The methods provide for satisfying a plurality of compressor torque demands to facilitate optimal engine designs. Accordingly, the nonequal torque split methods and apparatus facilitates assembly, operation, and maintenance of machines, and in particular gas turbine engines, in a cost-effective and reliable manner.

Exemplary embodiments of blade mapping method and system components are described above in detail. The components are not limited to the specific embodiments described herein, but rather, components of each system may be utilized independently and separately from other components described herein. Each blade mapping system component can also be used in combination with other blade mapping system components.

While the invention has been described in terms of various specific embodiments, those skilled in the art will recognize that the invention can be practiced with modification within the spirit and scope of the claims.

What is claimed is:

1. A method of assembling a gas turbine engine, said method comprising:
   coupling a first turbine shaft that includes m rows of first turbine blades within the gas turbine such that the first turbine shaft is rotatable in a first direction; and
   coupling a second turbine shaft that includes n rows of second turbine blades within the gas turbine such that the second turbine shaft is rotatable in a second direction wherein a torque split between the first and second turbine shafts is substantially proportional to a number of rows of turbine blades on each shaft relative to a total number of rows of blades on both shafts, wherein m represents the number of first rows of turbine blades and n represents the number of second rows of turbine blades, and wherein m and n are selected to provide a torque split between the first low pressure turbine shaft and second low pressure turbine shaft of greater than about 1.2:1.

2. A method in accordance with claim 1 wherein m and n are selected to provide a torque split between the first low-pressure turbine shaft and second low-pressure turbine shaft of greater than 1.5 to 1.

3. A method in accordance with claim 1 wherein m and n are selected to provide a torque split between the first low-pressure turbine shaft and second low-pressure turbine shaft of greater than 2.0 to 1.

4. A method in accordance with claim 1 further comprising providing at least one row of nonrotating stator blades adjacent at least one of a portion of the m rows of turbine blades and a portion of the n rows of turbine blades.

5. A method in accordance with claim 1 further comprising interdigitating at least a portion of the m rows of turbine blades and a portion of the n rows of turbine blades.

6. A method in accordance with claim 1 further comprising interdigitating at least a portion of the m rows of turbine blades and at least one row of nonrotating stator blades.

7. A method in accordance with claim 1 further comprising interdigitating at least a portion of the n rows of turbine blades and at least one row of nonrotating stator blades.

8. A gas turbine engine assembly comprising:
   a compressor;
   a high pressure turbine coupled to said compressor by a rotor shaft; and
   a low pressure turbine comprising at least one row of turbine stator blades spaced circumferentially apart and defining at least a portion of a flowpath extending through said low pressure turbine, said low pressure turbine further comprising a first rotor shaft coaxially aligned about a second rotor shaft, said first rotor shaft comprising m first rows of turbine blades, said second rotor shaft comprising n second rows of turbine blades, wherein m represents the number of first rows of turbine blades, n represents the number of second rows of turbine blades, and m and n are a different number with respect to each other, wherein at least a portion of said n second rows of turbine blades are interdigitated with at least a portion of said m first rows of turbine blades, said first rotor shaft rotatably coupled to a first compressor, said second rotor shaft rotatably coupled to a second compressor, and wherein m and n are selected to provide a torque split between the first low pressure turbine shaft and second low pressure turbine shaft of greater than about 1.2:1.

9. A gas turbine engine turbine assembly in accordance with claim 8 wherein a portion of said m first rows of turbine blades are interdigitated with said at least one row of stator blades.

10. A gas turbine engine turbine assembly in accordance with claim 8 wherein a portion of said n second rows of turbine blades are interdigitated with said at least one low-pressure turbine stator blade row.

11. A gas turbine engine turbine assembly in accordance with claim 8 wherein an amount of total turbine torque that is available from said first rotor shaft is proportional to $m/(m+n)$, and wherein an amount of turbine torque that is available from said second turbine shaft is proportional to $n/(m+n)$.

12. A gas turbine engine turbine assembly in accordance with claim 8 wherein said first compressor comprises a forward fan positioned axially upstream from said second compressor, said second compressor comprises an aft fan positioned axially downstream from said forward fan.

13. A gas turbine engine turbine assembly in accordance with claim 8 wherein one of said first compressor and said second compressor comprises a fan and a booster compressor.

14. A gas turbine engine turbine assembly in accordance with claim 8 wherein a torque demand of said first turbine shaft is different than a torque demand of said second turbine shaft.

15. A gas turbine engine turbine assembly in accordance with claim 8 wherein m and n are selected to generate a turbine torque split that is substantially equal to a ratio of a torque demand of said first turbine shaft and said second turbine shaft.

16. A gas turbine engine assembly comprising a counter-rotatable low pressure turbine comprising:
a low pressure turbine flowpath;
a first forward fan shaft comprising a forward fan coupled to a compressor end of said first forward fan shaft and m first low pressure turbine blade rows extending into said low pressure turbine flowpath; and
a second aft fan shaft coaxially aligned about a longitudinal axis with said first forward fan shaft, said second aft fan shaft including n second low pressure turbine blade rows extending into said low pressure turbine flowpath, wherein m represents the number of first rows of turbine blades, n represents the number of second rows of turbine blades, and m and n are different numbers with respect to each other, wherein at least a portion of said n second low pressure turbine blade rows are interdigitated with at least a portion of said m first low pressure turbine blade rows, and wherein m and n are selected to provide a torque split between the first low pressure turbine shaft and second low pressure turbine shaft of greater than about 1.2:1.

17. A gas turbine engine turbine assembly in accordance with claim 16 wherein m and n are selected to facilitate minimizing a low pressure turbine flowpath tangential momentum differential from a flowpath inlet to a flowpath outlet.

18. A gas turbine engine turbine assembly in accordance with claim 16 wherein said forward fan generates a first torque demand on said first forward fan shaft at an optimal forward fan rotational speed, said aft fan generates a second torque demand on said second aft fan shaft an optimal aft fan rotational speed wherein said first torque demand differs from said second torque demand by an amount greater than twenty percent, said m and said n are selected to facilitate said first low pressure turbine blade rows and said second low pressure turbine blade rows providing said first and said second torque demand.

* * * * *